US007788653B2

(12) United States Patent
Shi et al.

(10) Patent No.: US 7,788,653 B2
(45) Date of Patent: Aug. 31, 2010

(54) APPARATUS AND METHODS FOR PERFORMING GENERATIONAL ESCAPE ANALYSIS IN MANAGED RUNTIME ENVIRONMENTS

(75) Inventors: Xiaohua Shi, Beijing (CN); Guei-Yuan Lueh, San Jose, CA (US); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1649 days.

(21) Appl. No.: 10/791,004

(22) Filed: Mar. 2, 2004

(65) Prior Publication Data

US 2005/0198625 A1 Sep. 8, 2005

(51) Int. Cl.
*G06F 9/45* (2006.01)
(52) U.S. Cl. ............... 717/146; 717/151; 717/153; 717/154; 717/157
(58) Field of Classification Search ........... 717/146, 717/151, 153, 154, 157
See application file for complete search history.

(56) References Cited

U.S. PATENT DOCUMENTS

| 6,282,702 | B1 * | 8/2001 | Ungar ............... 717/154 |
| 6,434,577 | B1 * | 8/2002 | Garthwaite ............ 707/206 |
| 6,665,865 | B1 * | 12/2003 | Ruf ................. 717/157 |
| 6,681,385 | B1 * | 1/2004 | Steensgaard et al. ........ 717/133 |
| 6,999,980 | B2 * | 2/2006 | Detlefs et al. ............ 707/206 |
| 7,065,755 | B2 * | 6/2006 | Daynes et al. ............ 717/148 |
| 7,076,773 | B2 * | 7/2006 | Schmidt ............... 717/153 |
| 7,168,071 | B2 * | 1/2007 | Wu et al. .............. 717/153 |
| 2002/0188935 | A1 * | 12/2002 | Hertling et al. ........... 717/170 |

OTHER PUBLICATIONS

Choi, et al. "Escape Analysis for Java", 1999, ACM, pp. 1-19.*
Stoller, S. D. "Domain Partitioning for Open Reactive Systems", 2002, ACM, pp. 44-54.*
Whaley, et al. "Cloning-Based Context-Sensitive Pointer Alias Analysis Using Binary Decision Diagrams", 2004, ACM, pp. 131-144.*
Ruf, Erik, "*Effective Syncronization Removal for Java*", Conference on Programming Language Design and Implementation, PLDI 2000, Vancouver, Canada, pp. 208-218.

* cited by examiner

*Primary Examiner*—Wei Y Zhen
*Assistant Examiner*—Qamrun Nahar
(74) *Attorney, Agent, or Firm*—Hanley, Flight and Zimmerman, LLC

(57) ABSTRACT

Apparatus and methods for performing generational escape analysis in managed runtime environments are disclosed. The disclosed apparatus and methods determine the generational age of an equivalence class while performing escape analysis. Equivalence classes having generational ages are cloned if their generational ages are less than a threshold age.

21 Claims, 6 Drawing Sheets

US 7,788,653 B2

APPARATUS AND METHODS FOR PERFORMING GENERATIONAL ESCAPE ANALYSIS IN MANAGED RUNTIME ENVIRONMENTS

FIELD OF THE DISCLOSURE

The present disclosure relates generally to managed runtime environments and, more specifically, to apparatus and methods for performing generational escape analysis in managed runtime environments.

BACKGROUND

The need for increased software application portability (i.e., the ability to execute a given software application on a variety of platforms having different hardware, operating systems, etc.), as well as the need to reduce time to market for independent software vendors (ISVs), have resulted in increased development and usage of managed runtime environments.

Managed runtime environments are typically implemented using a dynamic programming language such as, for example, JAVA programming language, C#, etc. A software engine (e.g., a Java Virtual Machine (JVM®) software engine, a Common Language Runtime (CLR) software engine, etc.), which is commonly referred to as a runtime environment, executes the dynamic program language instructions. The runtime environment interposes or interfaces between dynamic program language instructions (e.g., a JAVA program or source code) to be executed and the target execution platform (i.e., the hardware and operating system(s) of the computer executing the dynamic program) so that the dynamic program can be executed in a platform independent manner.

Dynamic program language instructions (e.g., JAVA instructions) are not statically compiled and linked directly into native or machine code for execution by the target platform (i.e., the operating system and hardware of the target processing system or platform). Instead, dynamic program language instructions are statically compiled into an intermediate language (e.g., bytecodes) and the intermediate language may be interpreted or subsequently compiled by a just-in-time (JIT) compiler into native code or machine code that can be executed by the target processing system or platform. Typically, the JIT compiler is provided by a runtime environment that is hosted by the operating system of a target processing platform such as, for example, a computer system. Thus, the runtime environment and, in particular, the JIT compiler, translates platform independent program instructions (e.g., JAVA bytecodes, C# bytecodes, etc.) into native code (i.e., machine code that can be executed by an underlying target processing system or platform).

To improve overall productivity, many dynamic programming languages and their supporting managed runtime environments provide infrastructure that enables concurrent programming techniques such as, for example, multi-threading to be employed. In particular, many dynamic programming languages provide synchronization features or operations that enable multiple concurrent threads of execution to share or access a given object and its variables without causing a conflict or contention. For example, in the case of a globally accessible object (i.e., a public object), the software designer typically assumes that conflict or contention can occur during runtime and includes appropriate synchronization operations within the object to prevent such a conflict or contention. In this manner, the software designer can guarantee that the globally accessible object is "thread safe" (i.e., can be employed in a multi-threading runtime environment without conflicts or contention).

Unfortunately, the processing overhead associated with object synchronization results in a significant reduction in execution time. For example, in the case of some well-known JAVA applications and benchmarks, synchronization overhead may consume between about ten to twenty percent of overall execution time. Furthermore, synchronization is usually employed as a safeguard to prevent contentions during runtime (particularly in the case of object libraries), regardless of whether such synchronization is actually required during runtime.

Known escape analysis techniques can be used to increase the overall execution speed of code including unnecessary synchronization. In general, known escape analysis techniques employ a whole program analysis that enables the removal of synchronization operations associated with non-global objects and global objects for which there will be no contention during runtime execution of the program.

Known escape analysis techniques typically traverse the call graph in two passes, one of which is a bottom-up pass and the other of which is a top-down pass. While traversing the call graph in a bottom-up manner, known escape analysis techniques parse encountered methods into one or more equivalence classes using intra-procedural escape analysis. The one or more equivalence classes may be used as a representation of the parsed method. The representation may include, for example, equivalence classes that represent method arguments. Further, known escape analysis techniques replicate (i.e., clone) the equivalence classes representing arguments while performing inter-procedural escape analysis. Such replication of equivalence classes can result in significant memory consumption.

DETAILED DESCRIPTION

Figure 1:
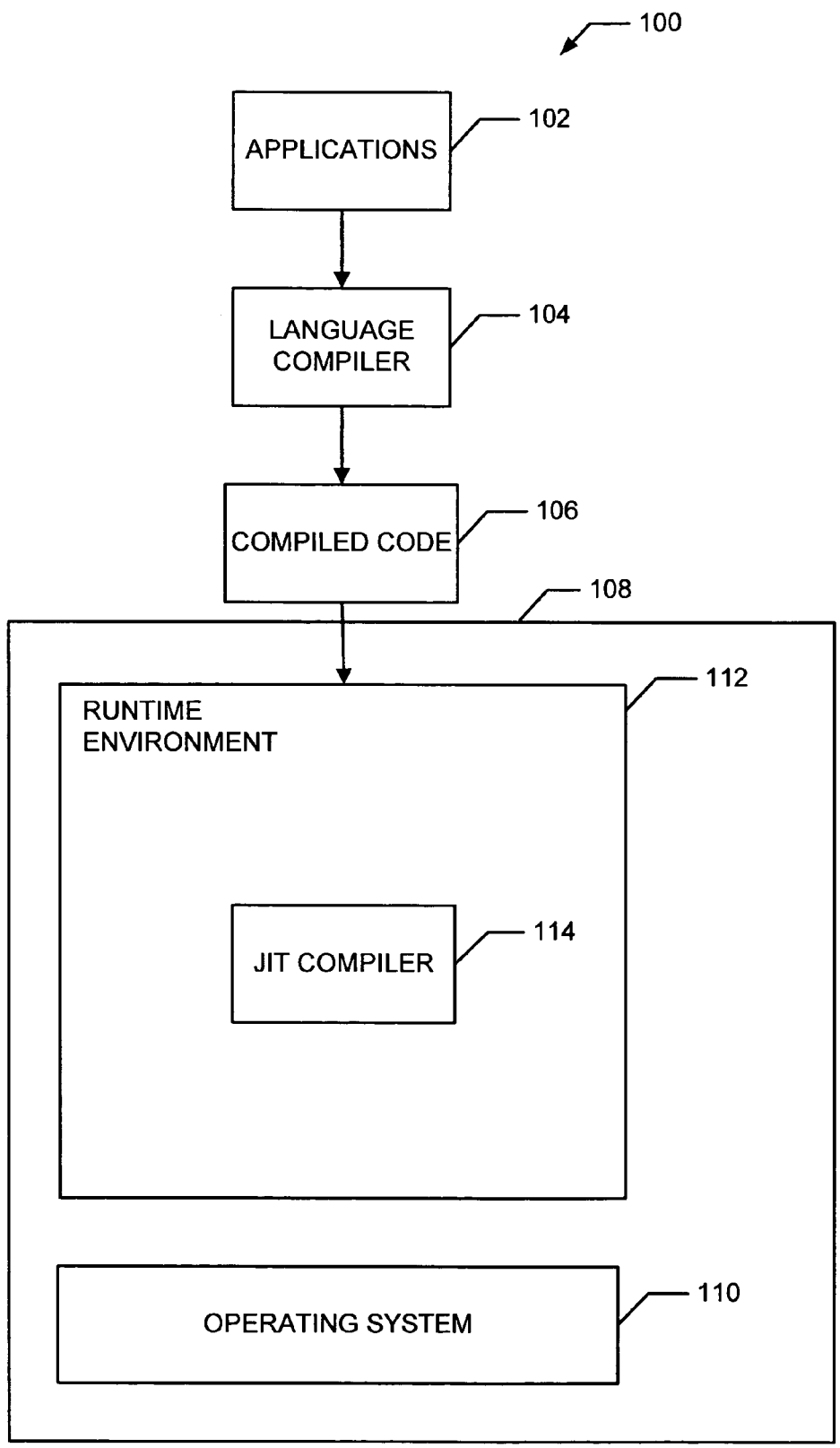
FIG. 1 is a block diagram of an example architecture that may be used to implement the generational equivalence class apparatus and methods disclosed herein.

FIG. 1 is a block diagram of an example architecture 100 that may be used to implement the generational escape analysis apparatus and methods described herein. For the example architecture 100, one or more software applications 102, which are composed of one or more dynamic programming languages and/or instructions, are provided to a language compiler 104. The applications 102 may be written using a platform independent language such as, for example, JAVA programming language or C#. However, any other dynamic or platform independent computer language or instructions could be used instead. In addition, some or all of the applications 102 may be stored within the system on which the applications are to be executed. Additionally or alternatively, some or all of the applications may be stored on a system that is separate (and possibly remotely located) from the system on which the applications 102 are to be executed.

The language compiler 104 statically compiles one or more of the applications 102 to generate compiled code 106. The compiled code 106 is intermediate language code or instructions (e.g., bytecodes in the case where the complied application(s) are written in JAVA programming language) that is stored in a binary format in a memory (not shown). As with the applications 102, the compiled code 106 may be stored locally on a target system 108, on which the compiled code 106 is to be executed. The target system 108 may be a computer system or the like such as that described in greater detail below in connection with FIG. 7. The target system 108 may be associated with one or more end-users or the like. Additionally or alternatively, the compiled code 106 may be delivered to the target system 108 via a communication link or links including, for example, a local area network, the Internet, a cellular or other wireless communication system, etc.

One or more portions of the compiled code 106 (e.g., one or more software applications) may be executed by the target system 108. In particular, an operating system 110 such as, for example, Windows, Linux, etc., hosts a runtime environment 112 that executes one or more portions of the compiled code 106. For example, in the case where the compiled code 106 includes JAVA bytecodes, the runtime environment 112 is based on a JAVA Virtual Machine (JVM®) software engine or the like that executes JAVA bytecodes. The runtime environment 112 loads one or more portions of the compiled code 106 (i.e., the intermediate language instructions or code) into a memory (not shown) accessible by the runtime environment 112. Preferably, the runtime environment 112 loads an entire application (or possibly multiple applications) into the memory and verifies the compiled or intermediate language code 106 for type safety.

After the application or multiple applications are loaded into memory by the runtime environment 112, the intermediate language instructions associated with methods or objects called by the application being executed or otherwise needed to execute the application may be processed by a just-in-time (JIT) compiler 114. The JIT compiler 114 compiles the intermediate language instructions to generate native code or machine code that is executed by one or more processors (such as, for example, the processor 722 shown in FIG. 7) within the target system 108.

In general, dynamic programming languages such as, for example, JAVA programming language, provide synchronization features that enable software designers to generate thread-safe code or software objects. A synchronized software object can only be accessed by one execution thread at a time, thereby preventing a conflict or contention associated with arguments or variables used by the object from occurring. In other words, global objects and other objects accessible by more than one execution thread can be made thread safe by introducing software lock and unlock mechanisms that prevent more than one thread from simultaneously accessing the objects. However, use of synchronization imposes a significant overhead on applications.

Escape analysis is a technique that eliminates unnecessary synchronization operations. In particular, an object may escape the method that created the object (i.e., the object is not local to the method). Alternatively, the object may escape the thread that created the object (i.e., other threads may access the object). Further, escape analysis may also guide allocation of stack objects to create JAVA objects on the stack rather than on the heap (i.e., an area of the main memory that a program may use to store data in a varying amount known only when the program is running).

Persons of ordinary skill in the art will readily recognize that a formal argument is a name in a method definition that is replaced by, or bound to, a corresponding actual argument when the method is called. Further, persons of ordinary skill in the art will readily recognize that an actual argument is a value, expression or reference passed to a method when the method is called and which replaces or is bound to the corresponding formal argument. Persons of ordinary skill in the art will further appreciate that known escape analysis techniques may clone the equivalence classes representing a callee method while analyzing a corresponding caller method. For example, a method FOO may include formal arguments A0 and A1 (i.e., FOO is declared as FOO(A0, A1)) and a method BAR may call the method FOO with actual arguments B0 and B1 (i.e., BAR calls FOO as FOO(B0, B1)). Known escape analysis techniques will replicate the equivalence class representing the formal argument A0, which is the formal argument of the callee method (e.g., FOO), and merge this equivalence class with the equivalence class representing the actual argument B0, which is the actual argument of the caller method (e.g., BAR).

Figure 2:
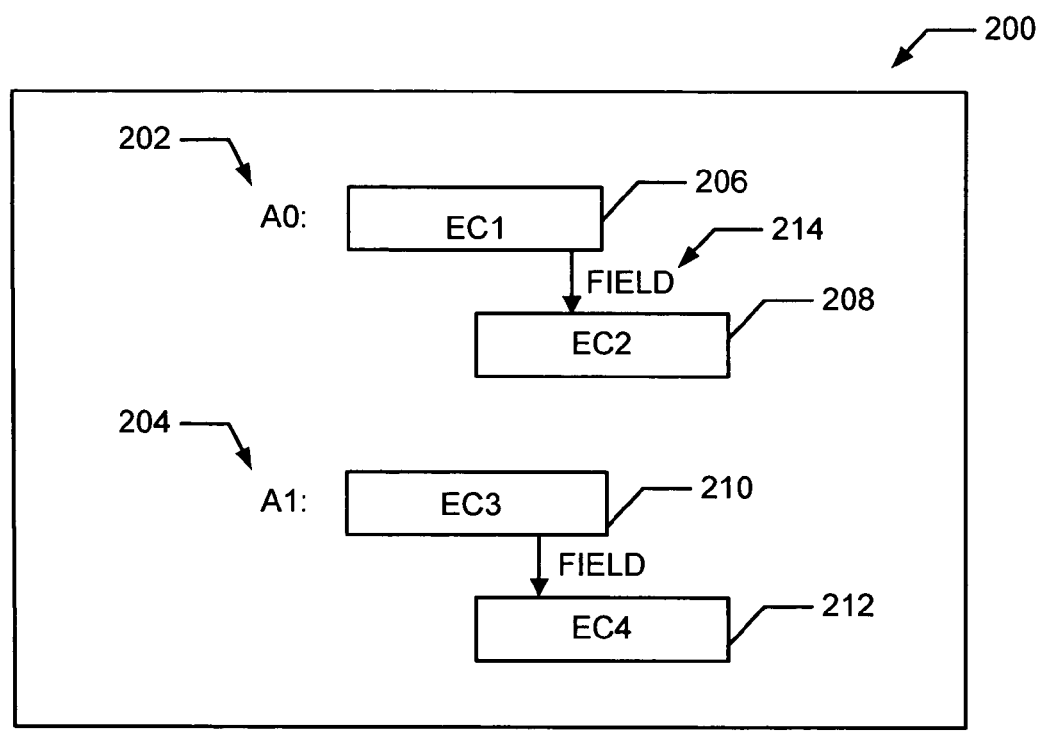
FIG. 2 is a block diagram of an example method and its associated equivalence classes.

FIG. 2 depicts equivalence classes associated with an example method FOO 200. The example method FOO 200 contains a formal argument A0 202 and a formal argument A1 204. The formal argument A0 202 is represented by equivalence classes EC1 206 and EC2 208, and the formal argument A1 204 is represented by equivalence classes EC3 210 and EC4 212. An equivalence class representing a method argument may refer to other equivalence classes using, for example, a reference pointer 214, a memory map (memory map not shown), or any other means of referring to an equivalence class. The equivalence class EC2 208, referenced by the pointer 214, may also be replicated when the class containing the reference pointer (i.e., equivalence class EC1 206) is replicated.

Figure 3:
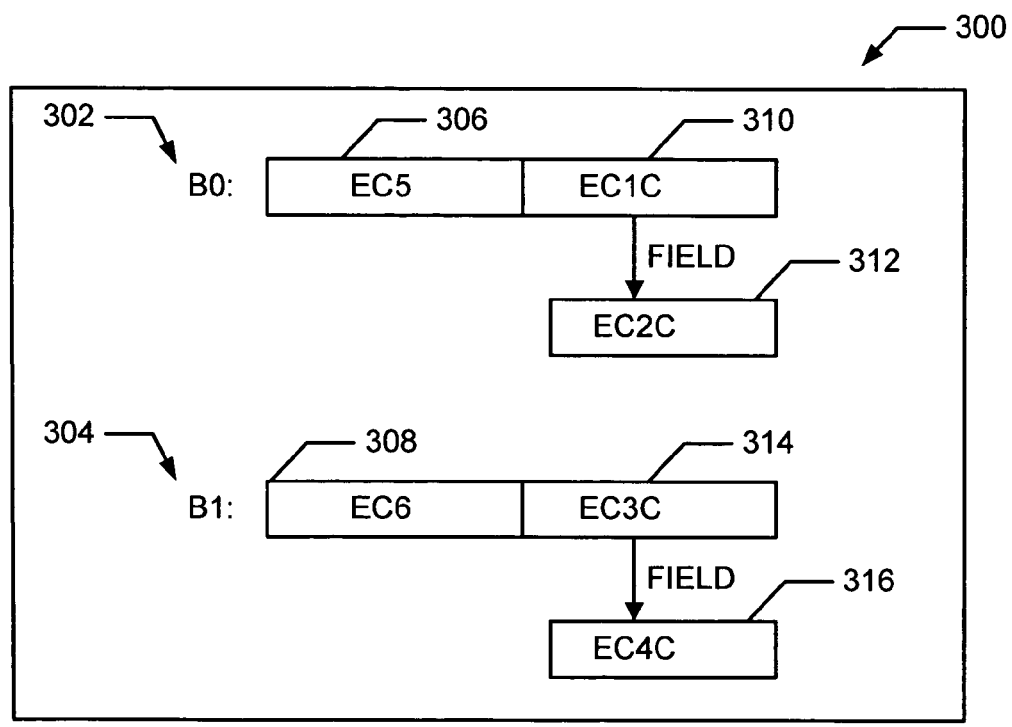
FIG. 3 is a block diagram of the example method depicted in FIG. 2 and associated equivalence classes after one iteration of an inter-procedural escape analysis.

FIG. 3 depicts an example of a calling method BAR 300 after an inter-procedural escape analysis. The actual arguments of the example calling method BAR 300 are represented by the actual argument B0 302 and the actual argument B1 304. As shown in FIG. 3, the actual argument B0 302 is represented by an equivalence class EC5 306 and the actual argument B1 304 is represented by an equivalence class EC6 308.

Known escape analysis techniques clone (i.e., replicate) the equivalence classes representing the formal arguments of the callee method and merge the cloned equivalence classes representing the formal arguments of the callee method with the equivalence classes of the caller method. In FIG. 3, the equivalence classes EC1C 310, EC2C 312, EC3C 314, and EC4C 316 represent clones of the equivalence classes representing the formal arguments EC1 206, EC2 208, EC3 210, and EC4 212, respectively (FIG. 2). Further, known escape analysis techniques clone a referee of an equivalence class representing a formal argument of a callee method. In FIG. 3 equivalence classes EC2C 312 and EC4C 316 are clones of equivalence classes representing referee equivalence classes EC2 208 and EC4 212, respectively.

As previously noted, known escape analysis techniques clone the equivalence classes representing formal arguments of the callee method and merge them with the equivalence classes representing the actual arguments of the caller method. Thus, performance of a known escape analysis technique merges the equivalence class EC1C 310 with the equivalence class EC5 306, and merges the equivalence class EC3C 314 with the equivalence class EC6 308. As seen in FIG. 3, traversing one level up the call graph can result in the cloning of many classes, which results in significant consumption of memory.

Figure 4:
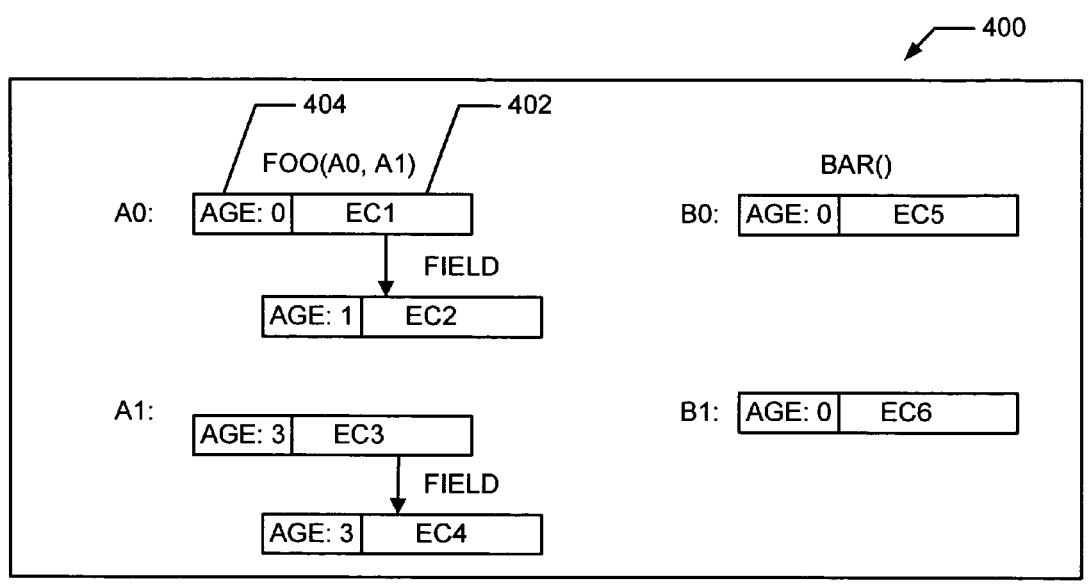
FIG. 4 is a block diagram of equivalence classes with associated generational ages.

To identify classes that do not need to be cloned, a generational age field may be added to each equivalence class as depicted in FIG. 4 and described in greater detail below. In general, the generational age of an equivalence class may be initialized to any value and may be incremented each time an equivalence class is cloned during generational escape analysis. If the equivalence class is greater than or equal to a generational age threshold, then the equivalence class may be labeled as old. On the other hand, equivalence classes that are less than the generational age threshold may be labeled as young. Instead of cloning old equivalence classes, the generational escape analysis disclosed herein refers to old equivalence classes using, for example, a pointer or any other means of referring to an equivalence class. By referring to old equivalence classes rather than cloning old equivalence classes, the generational escape analysis can significantly reduce memory consumption. FIG. 4 depicts the equivalence classes associated with FOO and BAR containing generational age information 400. For example, an equivalence class EC1 402 has a generational age of zero 404.

Figure 5:
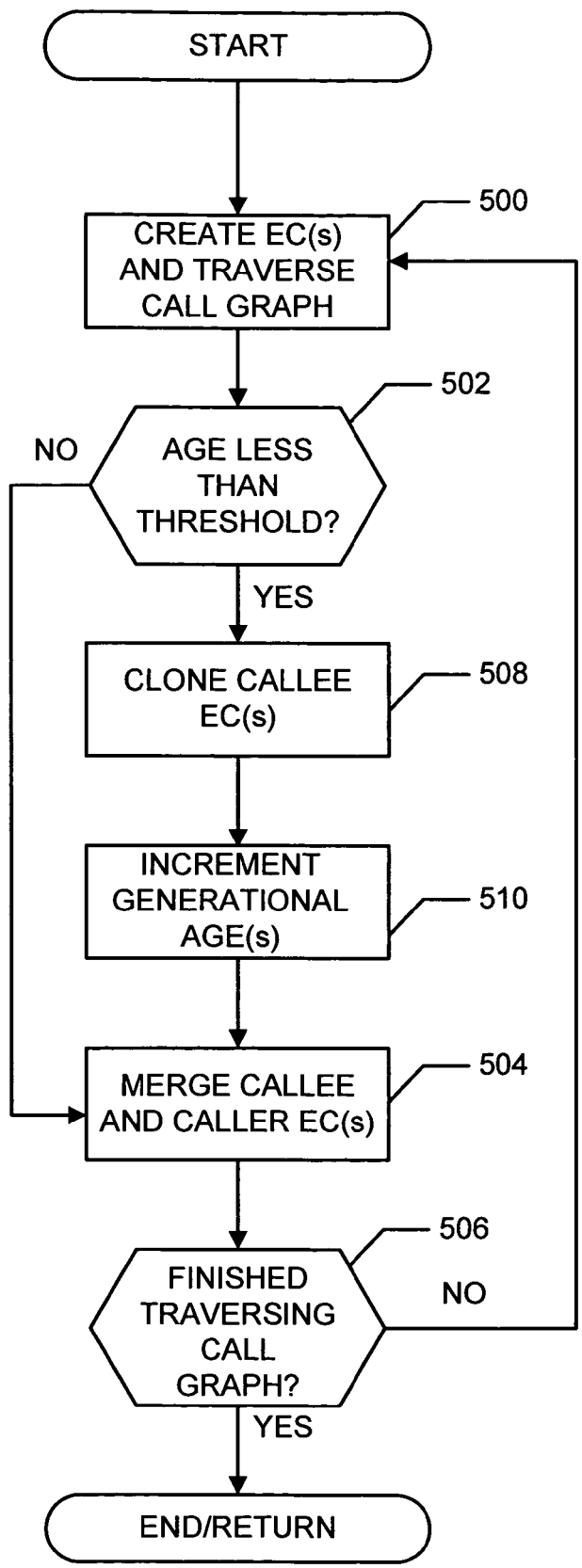
FIG. 5 is a flow diagram of an example inter-procedural generational escape analysis performed using generational information.

FIG. 5 is a flow diagram of an example manner in which the just-in-time (JIT) compiler (e.g., the just-in-time (JIT) compiler 114 of FIG. 1) can be configured to perform generational escape analysis. Initially, the example escape analysis creates equivalence classes associated with an analyzed method and traverses one level up the call graph (block 500). The example generational escape analysis then determines if the generational age associated with each equivalence class is less than a generational age threshold (i.e., determines if the equivalence class is young) (block 502). If the generational age is not less than the generational age threshold at block 502 (i.e., the equivalence class is old), then the equivalence classes of the callee method are merged into the corresponding equivalence classes of the caller method (block 504). The example generational escape analysis then determines if inter-procedural generational escape analysis has finished traversing the call graph block 506.

If, at block 502, the generational age of the equivalence class is less than the generational age threshold (i.e., the equivalence class is young), then the equivalence classes of the callee method are cloned (block 508) and the generational age associated with each equivalence class is incremented (block 510). Further, the cloned equivalence classes of the callee method are merged with the equivalence classes of the caller method (block 504), and the example escape analysis determines if the inter-procedural generational escape analysis has finished traversing the call graph (block 506).

Figure 6:
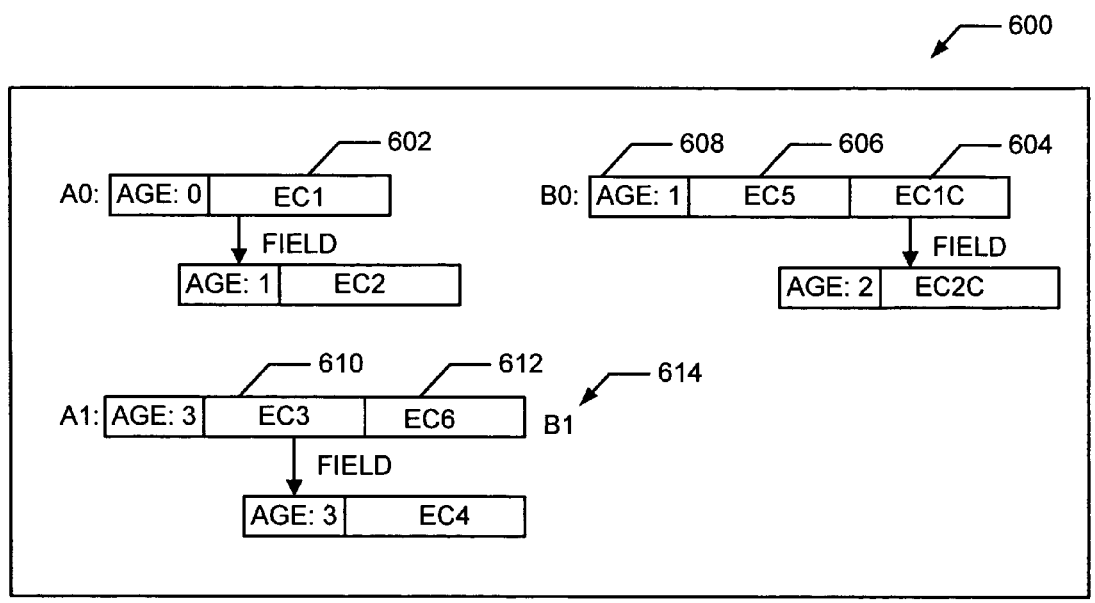
FIG. 6 is a block diagram of equivalence classes with generational ages after an inter-procedural generational escape analysis.

Before inter-procedural generational escape analysis, the equivalence classes associated with the example methods FOO 200 (FIG. 2) and BAR 300 (FIG. 3) may be in the state depicted in FIG. 4. FIG. 6 depicts the equivalence classes associated with the example methods FOO 200 and BAR 300 after inter-procedural escape analysis using generational age information and a generational age threshold of three. As shown in FIG. 6, cloning an equivalence class EC1 602 results in an equivalence class EC1C 604, which is merged with an equivalence class EC5 606. Prior to merging, the generational age of the equivalence class EC1C 604 was incremented from zero to one, and the equivalence class EC5 606 received the initial generational age of zero. The merged equivalence classes EC5 606 and EC1C 604 received the generational age one 608, which is the greater generational age of the equivalence class EC5 606 and the equivalence class EC1C 604. Because the generational age of an equivalence class EC3 610 is not less than the generational age threshold (which in this example equals three), the equivalence class EC3 610 is not cloned. Instead, an equivalence class EC6 612 is merged with the equivalence class EC3 610. The generational escape analysis refers to the merger of the equivalence class EC3 610 and the equivalence class EC6 612 using a memory reference technique such as, for example, a pointer set 614, a memory map (memory map not shown), or any other method of referring to an equivalence class.

Inter-procedural analysis of FOO 200 (FIG. 2) and BAR 300 (FIG. 3) using known escape analysis techniques results in six equivalence classes as shown in FIG. 3. However, inter-procedural analysis of FOO 200 (FIG. 2) and BAR 300 (FIG. 3) using generational information, results in the creation of only four equivalence classes as shown in FIG. 6. Propagation of these results to a full call graph traversal produces a substantial reduction in memory consumption.

Figure 7:
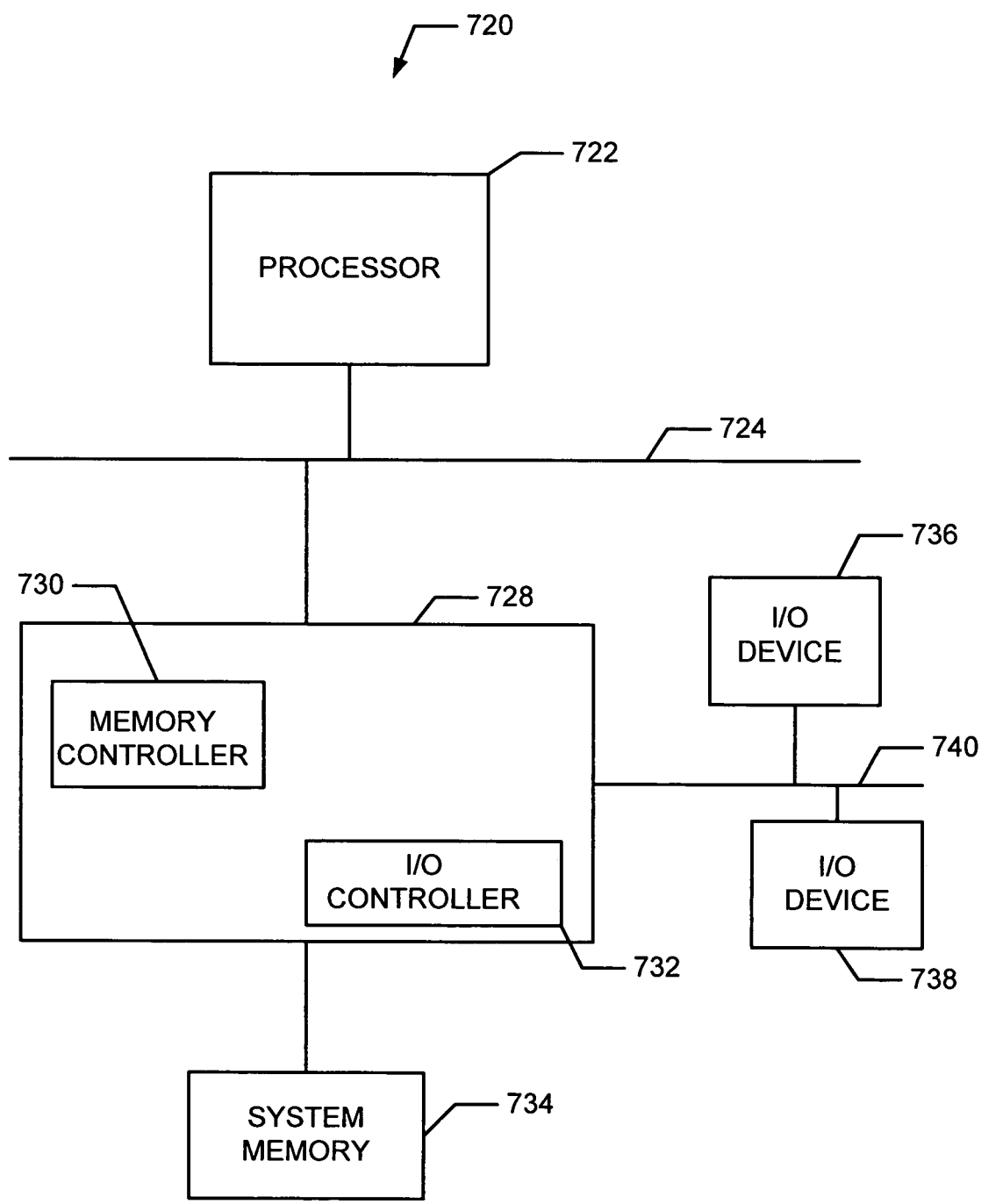
FIG. 7 is an example processor system that may be used to implement the apparatus and methods described herein.

FIG. 7 is a block diagram of an example processor system 720 that may be used to implement the apparatus and methods described herein. For example, the methods described herein may be implemented as instructions stored on a memory and executed by a processor coupled to the memory. As shown in FIG. 7, the processor system 720 includes a processor 722 that is coupled to an interconnection bus or network 724. The processor 722 may be any suitable processor, processing unit or microprocessor such as, for example, a processor from the Intel Itanium® family, Intel X-Scale® family, the Intel Pentium® family, etc. Although not shown in FIG. 7, the system 720 may be a multi-processor system and, thus, may include one or more additional processors that are identical or similar to the processor 722 and which are coupled to the interconnection bus or network 724.

The processor 722 of FIG. 7 is coupled to a chipset 728, which includes a memory controller 730 and an input/output (I/O) controller 732. As is well known, a chipset typically provides I/O and memory management functions as well as a plurality of general purpose and/or special purpose registers, timers, etc. that are accessible or used by one or more processors coupled to the chipset. The memory controller 730 performs functions that enable the processor 722 (or processors if there are multiple processors) to access a system memory 734, which may include any desired type of volatile memory such as, for example, static random access memory (SRAM), dynamic random access memory (DRAM), etc. The I/O controller 732 performs functions that enable the processor 722 to communicate with peripheral input/output (I/O) devices 736 and 738 via an I/O bus 740. The I/O devices 736 and 738 may be any desired type of I/O device such as, for example, a keyboard, a video display or monitor, a mouse, etc. While the memory controller 730 and the I/O controller 732 are depicted in FIG. 7 as separate functional blocks within the chipset 728, the functions performed by these blocks may be integrated within a single semiconductor circuit or may be implemented using two or more separate integrated circuits.

Although certain methods, apparatus and articles of manufacture have been described herein, the scope of coverage of this patent is not limited thereto. To the contrary, this patent covers all methods, apparatus and articles of manufacture fairly falling within the scope of the appended claims either literally or under the doctrine of equivalents.

What is claimed is:

1. A method comprising:

storing a generational age value in association with an equivalence class in a memory operatively associated with a processor configured to execute instructions associated with the equivalence class;
determining an age of the equivalence class based on the generational age value;
cloning the equivalence class in response to the age of the equivalence class being less than an age threshold;
incrementing the generational age value stored in association with the equivalence class in response to the cloning of the equivalence class; and
when the age of the equivalence class is not less than the age threshold:
not cloning the equivalence class;
merging the equivalence class with a second equivalence class; and
referencing the merged equivalence classes using a memory reference.

2. A method as defined in claim 1, wherein the equivalence class is associated with an escape analysis.

3. A method as defined in claim 1, wherein determining the age of the equivalence class includes an initialization operation.

4. A method as defined in claim 1, wherein determining the age of the equivalence class includes selecting the age of the equivalence class to be a greater age of first and second ages associated with respective merged equivalence classes.

5. A method as defined in claim 1, wherein cloning the equivalence class includes associating the equivalence class with one of an old equivalence class or a young equivalence class.

6. A method as defined in claim 5, further comprising associating the equivalence class with the old equivalence class in response to the age of the equivalence class being greater than or equal to the age threshold.

7. A method as defined in claim 5, further comprising associating the equivalence class with the young equivalence class in response to the age of the equivalence class being less than the age threshold.

8. A system comprising:
a memory; and
a processor coupled to the memory, the processor to:
store a generational age value in association with an equivalence class in the memory;
determine an age of the equivalence class based on the generational age value;
clone the equivalence class in response to the age of the equivalence class being less than an age threshold;
increment the generational age value stored in association with the equivalence class in response to the cloning of the equivalence class; and
when the age of the equivalence class is not less than the age threshold, the processor is further to:
not clone the equivalence class;
merge the equivalence class with a second equivalence class; and
reference the merged equivalence classes using a memory reference.

9. A system as defined in claim 8, wherein the equivalence class is associated with an escape analysis.

10. A system as defined in claim 8, wherein the processor is further to determine the age of the equivalence class subsequent to an initialization operation.

11. A system as defined in claim 8, wherein the processor is further to determine the age of the equivalence class by selecting the age of the equivalence class to be a greater age of first and second ages associated with respective merged equivalence classes.

12. A system as defined in claim 8, wherein the processor is further to clone the equivalence class by associating the equivalence class with one of an old equivalence class or a young equivalence class.

13. A system as defined in claim 12, wherein the processor is further to associate the equivalence class with the old equivalence class in response to the age of the equivalence class being greater than or equal to the age threshold.

14. A non-transitory system as defined in claim 12, wherein the processor is further to associate the equivalence class with the young equivalence class in response to the age of the equivalence class being less than the age threshold.

15. A machine accessible medium having instructions stored thereon that, when executed, cause a machine to:
store a generational age value in association with an equivalence class;
determine an age of the equivalence class based on the generational age value;
clone the equivalence class in response to the age of the equivalence class being less than an age threshold;
increment the generational age value stored in association with the equivalence class in response to the cloning of the equivalence class; and
when the age of the equivalence class is not less than the age threshold:
not clone the equivalence class;
merge the equivalence class with a second equivalence class; and
reference the merged equivalence classes using a memory reference.

16. A machine accessible medium as defined in claim 15, wherein the equivalence class is associated with an escape analysis.

17. A machine accessible medium as defined in claim 15 having instructions stored thereon that when executed cause the machine to determine the age of the equivalence class subsequent to an initialization operation.

18. A machine accessible medium as defined in claim 15 having instructions stored thereon that when executed cause the machine to determine the age of the equivalence class by selecting the age of the equivalence class to be a greater age of first and second ages associated with respective merged equivalence classes.

19. A machine accessible medium as defined in claim 15 having instructions stored thereon that when executed cause the machine to clone the equivalence class by associating the equivalence class with one of an old equivalence class or a young equivalence class.

20. A machine accessible medium as defined in claim 19 having instructions stored thereon that when executed cause the machine to associate the equivalence class with the old equivalence class in response to the age of the equivalence class being greater than or equal to the age threshold.

21. A machine accessible medium as defined in claim 19 having instructions stored thereon that when executed cause the machine to associate the equivalence class with the young equivalence class in response to the age of the equivalence class being less than the age threshold.

* * * * *

UNITED STATES PATENT AND TRADEMARK OFFICE
CERTIFICATE OF CORRECTION

PATENT NO. : 7,788,653 B2
APPLICATION NO. : 10/791004
DATED : August 31, 2010
INVENTOR(S) : Shi et al.

Page 1 of 1

It is certified that error appears in the above-identified patent and that said Letters Patent is hereby corrected as shown below:

Column 8, line 12 (Claim 14): after "A" and before "system" delete "non-transitory";

Column 8, line 16 (Claim 15): after "A" and before "machine" insert --non-transitory--;

Signed and Sealed this

Twenty-first Day of December, 2010

David J. Kappos
*Director of the United States Patent and Trademark Office*